United States Patent [19]
Wilson

[11] Patent Number: 5,845,915
[45] Date of Patent: Dec. 8, 1998

[54] BIN CADDY

[76] Inventor: Carol Ann Wilson, 145 Santa Lucia Dr., West Palm Beach, Fla. 33405

[21] Appl. No.: 698,393

[22] Filed: Aug. 15, 1996

Related U.S. Application Data

[63] Continuation-in-part of Ser. No. 386,272, Feb. 9, 1995, Pat. No. 5,595,395.

[51] Int. Cl.$^6$ ................................................ B62B 1/16
[52] U.S. Cl. ............................ 280/47.19; 280/47.29
[58] Field of Search ................................ 280/652, 654, 280/47.131, 47.17, 47.18, 47.19, 47.23, 47.24, 47.26, 47.27, 47.28, 47.29, 47.34, 47.35; 248/130, 137, 141, 298.1, 316.4

[56] References Cited

U.S. PATENT DOCUMENTS

| | | | |
|---|---|---|---|
| D. 182,206 | 2/1958 | Shepheard | 280/47.34 |
| 1,718,962 | 7/1929 | Kimball | 280/47.26 |
| 1,777,863 | 10/1930 | Seltzer | 280/47.17 |
| 1,800,679 | 4/1931 | Day | 280/47.27 |
| 2,384,235 | 9/1945 | Burnett | 280/47.19 |
| 2,430,107 | 11/1947 | Cronrath | 280/47.27 |
| 2,471,512 | 5/1949 | Barlock | 248/141 |
| 2,904,345 | 9/1959 | Bradley | 280/47.23 |
| 3,804,432 | 4/1974 | Lehrman | 280/654 |
| 3,948,537 | 4/1976 | Black | 280/654 |
| 4,821,903 | 4/1989 | Hayes | 280/47.26 |
| 4,984,704 | 1/1991 | O'Malley | 280/47.19 |
| 5,159,777 | 11/1992 | Gonzalez | 280/47.26 |
| 5,192,092 | 3/1993 | DiBenedetto | 280/654 |

FOREIGN PATENT DOCUMENTS

| | | | |
|---|---|---|---|
| 103634 | 6/1925 | Austria | 280/654 |
| 333380 | 8/1930 | United Kingdom | 280/47.26 |
| 933692 | 8/1963 | United Kingdom | 280/47.35 |

*Primary Examiner*—Brian L. Johnson
*Assistant Examiner*—Frank Vanaman
*Attorney, Agent, or Firm*—McHale & Slavin, P.A.

[57] ABSTRACT

A caddy providing for the stackable storage of various size bins used for holding items such as mail, recycling materials, and piece parts allowing each bin to rotate when the device is tilted during movement of the bins so as to prevent spillage of items placed within the bins. When used for holding of recycle bins, a homeowner may move the bins from the home to the curb without lifting of the bins yet provide ease of access. The bins are maintained in a substantially parallel and horizontal plane to the ground when placed in an upright and tilted position. Wheels and a handle of the device are predisposed to operate as a stand to assist in maintaining the positional rotation of each bin.

3 Claims, 6 Drawing Sheets

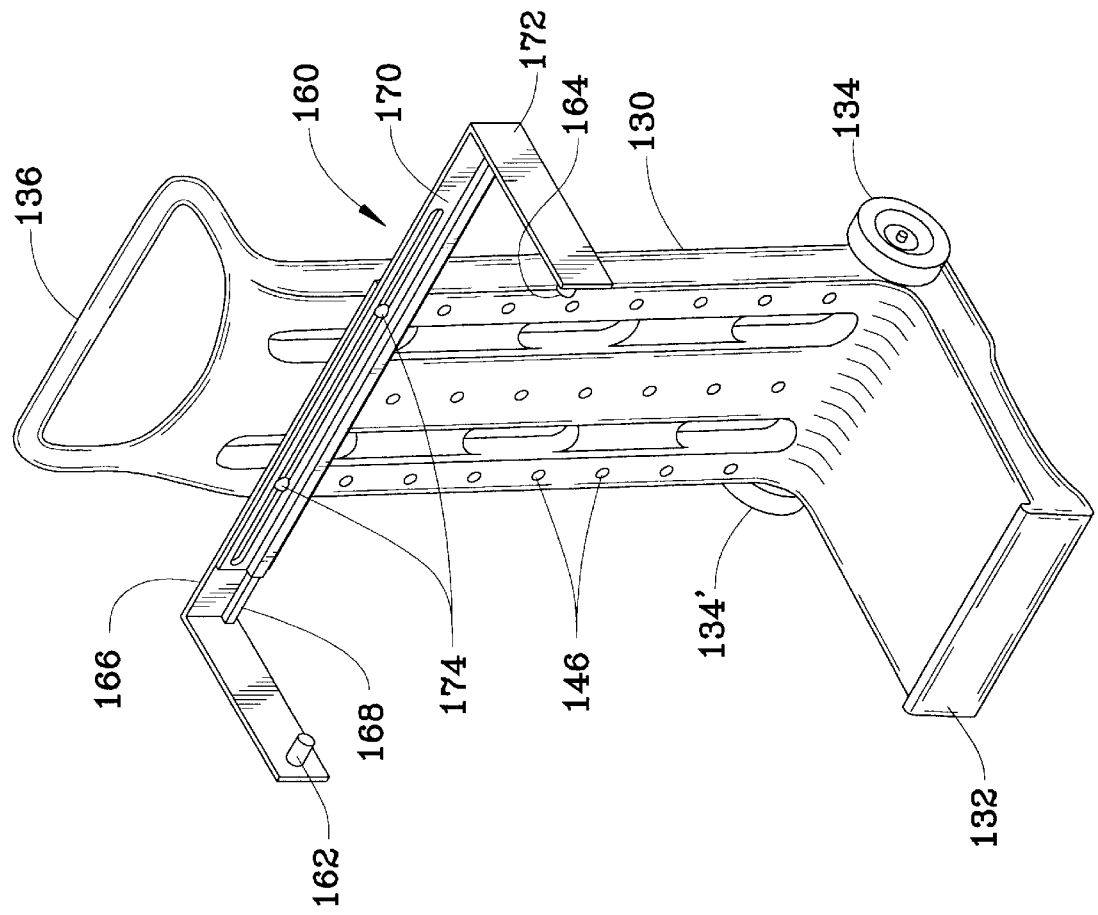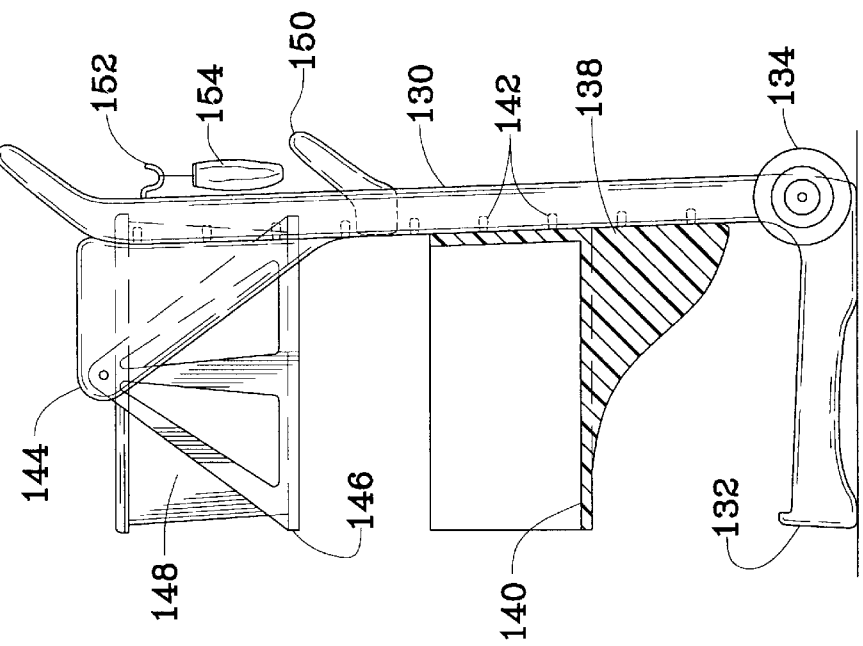

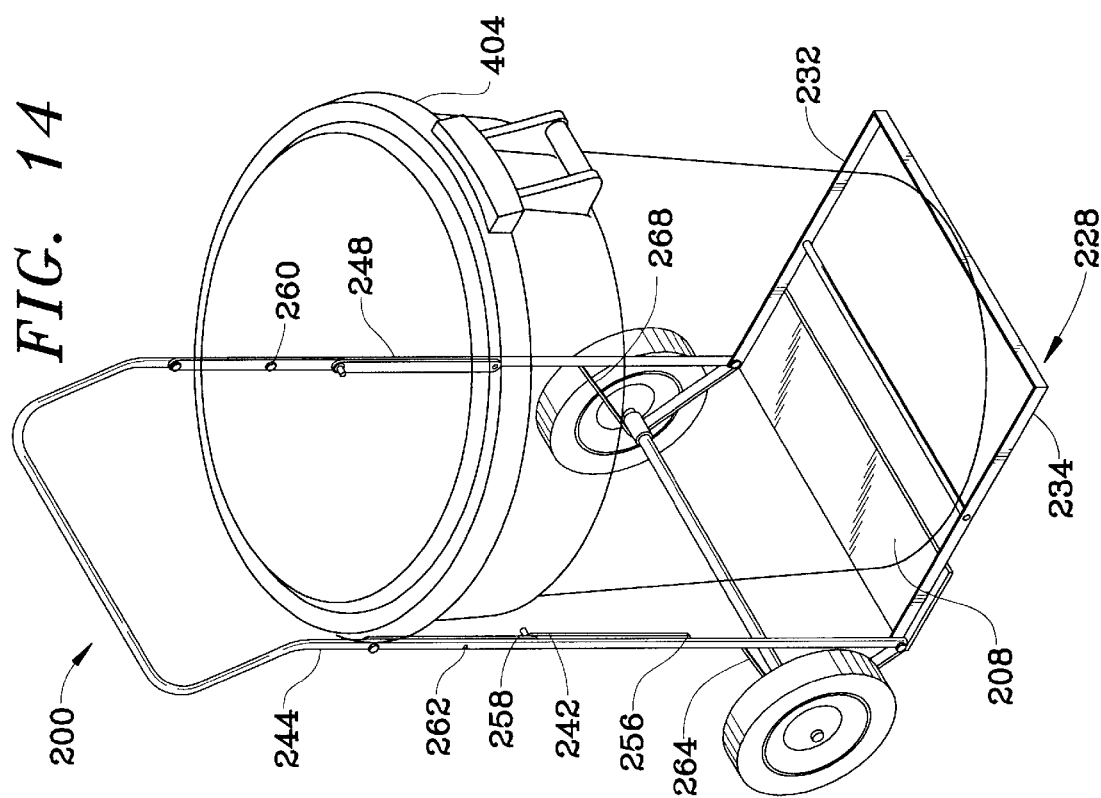
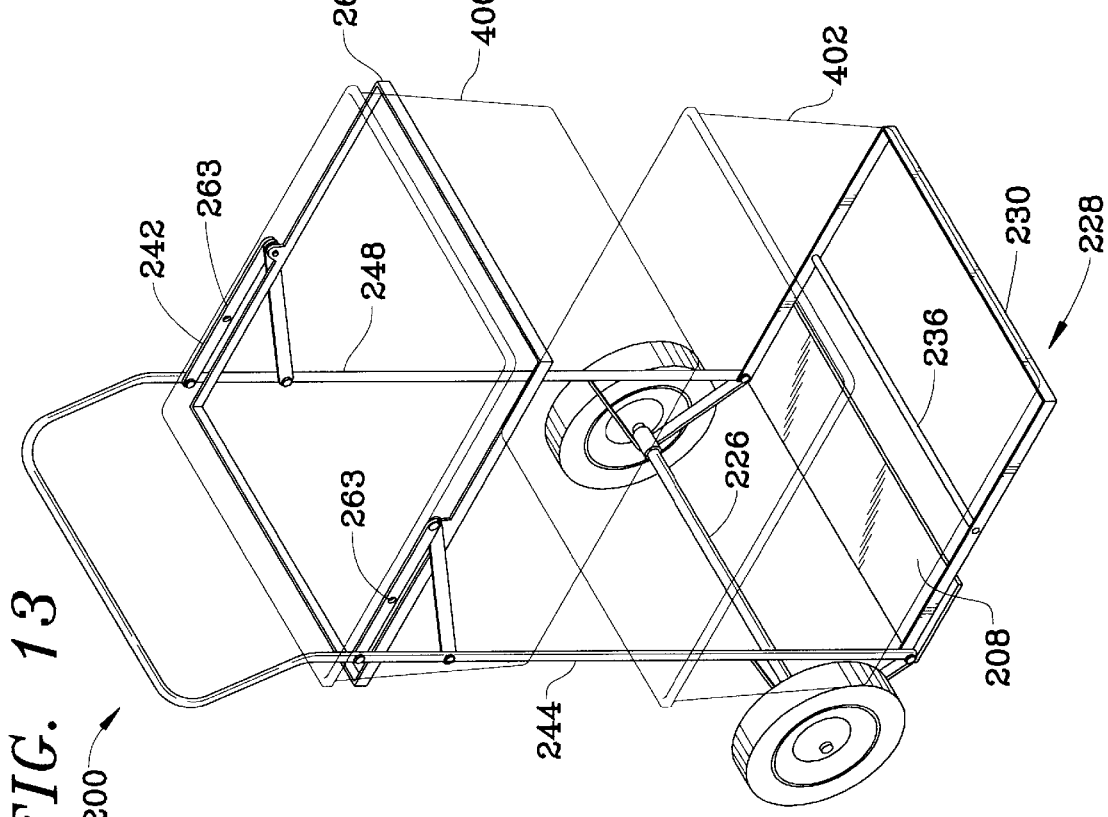

BIN CADDY

This application is a continuation-in-part of application Ser. No. 08/386,272 filed on Feb. 9, 1995 now U.S. Pat. No. 5,595,395.

FIELD THE INVENTION

The instant invention is related to the transfer of bins and in particular to a caddy having provisions for the storage and subsequent transfer of various sized bins maintaining the bins in a horizontal plane respective to the ground.

BACKGROUND OF THE INVENTION

A bin is commonly used for holding materials separate from other items. Use of a bin is limited only by one's imagination and new uses are being developed everyday. For instance, a relatively new use of bins is a direct result of an age-old problem, the landfill. Most landfills are nothing more than dumping grounds for waste including plastics, aluminum, glass, paper and other materials constructed from limited natural resources. As the rapid increase in population places a high demand on products manufactured from the aforementioned materials, the disposal of such waste has also increased to a level that now exceeds the capacity of present landfills in the United States. For this reason, efforts are now directed into recycling many waste materials providing a dual purpose of lessening the capacity requirements on a landfill as well as the burden on natural resources necessary to make the products. The primary device for holding separated wastes is the bin. Many municipalities have embraced this idea and provide the homeowner with color coded bins separating the recyclable materials such as aluminum, paper, glass, and plastic from each other. One bin may be for paper, another for plastic, yet another for aluminum cans. The recyclable materials are then collected on a weekly or bi-weekly basis.

The problem arises in that the public has dutifully responded to the recycling process, and in doing so they have painfully discovered the extensive amount of waste materials that each person produces. The recycling bins provided by the waste company are typically filled to the brim by the time they are picked up for recycling. Should a homeowner miss a pick up day, the weight of the bins can be excessive. If paper is to be recycled and weighted by water, the bin weight can reach one hundred pounds. For larger families or the elderly, the weight of the bins may be excessive. Even if an individual is physically fit, the haste in movement of a weighted bin may result in a painful injury to the back if moved incorrectly.

For this reason, a number of combination recycling bins and transferring carts are set forth in the prior art in an effort to address the transfer of recycle bins. U.S. Pat. No. 4,821,903 discloses a multi-trash bin cart having individual containers of a unique size that are placed upon a movable cart. By use of predefined containers the homeowner may place individual recyclable materials within each container which is then transported from the home to a curb side location where a recycle company can pick up the material by emptying the bins into the receptacle on the waste management vehicle. While the larger bins provide greater storage, the weight also increases and may be difficult for the worker to empty the bins.

U.S. Pat. No. 5,192,092 discloses a recycling bin cart having multiple shelves available for placement of conventional recycling bins. The bins may be slid off the shelves when necessary and the cart storable by folding the shelves upright allowing the cart to lay in a flattened position. Use of the cart in transferring of the filled bins requires tilting wherein the bins may slide off as there is no means for support of the bins when tilted. If the bins are secured to the shelf and filled with material, any tilting of the cart would result in spillage of the recyclable materials as the bins must tilt accordingly.

The aforementioned problem of holding bins in a stacked position is not limited to recycling bins and can be applied to most any industry where items of like constituents may be placed next to each other. For instance, the mail room of most every company has separate bins for first class mail, air mail, and third class packages. When a mail room clerk takes the items to the post office they typically stack the bins on top of each other which can result in damage to the contents of the mail. Similarly, the weight of multiple bins can exceed an individual's lifting strength resulting in injury to the worker and a possible Workmen Compensation claim. Still another industry that requires bins of dissimilar material may be found on the manufacturing floor of a factory where bins can be used to hold parts for an assembly line. As with any industry where lifting is preformed by the person, injury may result if the bin is lifted incorrectly during transfer. In addition, when multiple bins are used they may take up valuable floor space unless provisions are made for both stacking of the bins as well as access to the contents of the individual bins.

Thus what is needed in the art is a device capable of storing and transporting bins without spillage of the contents placed therein.

SUMMARY OF THE INVENTION

The instant invention is a cart device having provisions for holding and transporting various sized bins and maintaining the bins horizontal to the ground despite the angular placement of the device. The device is constructed of a rigid frame with two wheels and a handle. Brackets formed to the size of each bin are rotatably coupled to cantilever type supports which project outwardly from the front of the frame providing support for each bin.

The brackets used to support each bin may support various size bins such as a U.S. mail bin, by use of bracket inserts or flexible straps. In one embodiment the frame is constructed of two rails providing support of each end of a bin allowing bins to be stacked in a vertical position to conserve floor space. The bins are spaced apart making them readily acceptable to the placement and removal of materials and provide for rotational movement to maintain the bins in a horizontal plane to the ground despite the angular positioning of the frame. When used in a mail room the classification of letters allows placement of first class mail in one bin, air mail in another bin, and third class packages in yet another bin. When used for recycling materials, the classification of materials allows placement paper in one bin, plastic in another bin, and aluminum cans in yet another bin.

In a first embodiment, a bottom bin doubles as a support to prevent the tilting of the cart when placed in an upright position. The frame allows the device to be tilted onto wheels like a dolly wherein the pivotal action provided by each cantilever support allows for the rotation of each bin. The bins thus maintain a horizontal position to the ground at all times during storage and transit to prevent spillage of materials placed within the bins. The bins are removed from the device by simply lifting each bin from the support bracket. The cantilever pivot point prevents over oscillating of the bins by use of a friction engaging pivot pin, or alternatively, by use of a bin latch which engages the bin when tilted.

In a second embodiment, a single piece frame having a perpendicular placed platform structure provides an area for placement of materials in a similar format to that of a conventional dolly. Additional bins provide for the requisite tilting while the platform structure provides a fixed platform support. The frame includes a back portion to prevent items placed on the platform structure from falling through the frame when tilted. Wheels are placed in a raised position to provide a rigid stance without wheel contact when the bins are placed in a stacked position. The wheels contact the ground allowing for the ease of transporting the bins when necessary.

Yet another embodiment provides for the adjustable placement of bins by use of an integrated bin bracket and cantilever support. In this embodiment the frame includes provisions for attaching the brackets along the length thereof allowing the operator to place each bin at the most efficient position. The bracket further allows for adjusting to the various size bins by use of individual slidable supports which form the bracket.

Thus, an objective of the instant invention is to set forth a device that will provide for the stacking of bins in an upright position which further allows for the transfer of such bins in a substantially horizontal position.

Another objective of the invention is to teach the use of a device for stacking recycling material bins in an upright position and allowing for the transfer of said bins to a curb side position where they can be placed in a horizontal position for ease of removal.

Yet still another objective of the invention is to teach the use of a device for stacking mail bins in an upright position and allowing for the transfer of said bins maintaining distinguishable separation of said bins.

Still another objective of the invention is to provide a stackable caddy holder having cantilever supports with pivotable sections so as to maintain materials placed between the supports in a horizontal position despite the angular positioning of the support frame.

Another objective of the invention is to provide the use of bin inserts and flexible straps allowing for adaptability of different size bins to the device.

Yet still another objective of the instant invention is to teach the use of a bin caddy relying on bins to provide structural rigidity to the frame.

Still another objective of the instant invention is to provide a rigid support base allowing support of items in combination with the aforementioned tiltable bin bracketry.

Yet still another objective of the instant invention is to provide a frame which allows for the adjustable placement of bin supports.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

BRIEF DESCRIPTION OF THE DRAWINGS

FIG. 7 is a side view of a third embodiment of the instant invention having adjustable bins;

FIG. 8 is a perspective view of the third embodiment having an adjustable bracket.

FIG. 13 is a pictorial view of FIG. 10;

FIG. 14 is a pictorial view of the device supporting a storage container.

DETAILED DESCRIPTION OF THE PREFERRED EMBODIMENT

Figure 1:
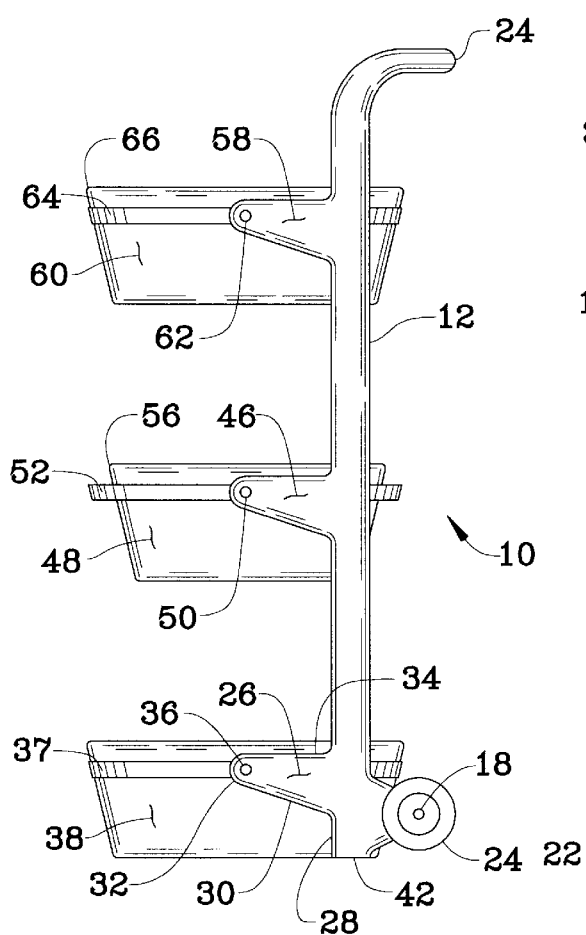
FIG. 1 is a side elevational view of a first embodiment of the instant invention with a lower bin operating as a frame support.
Figure 2:
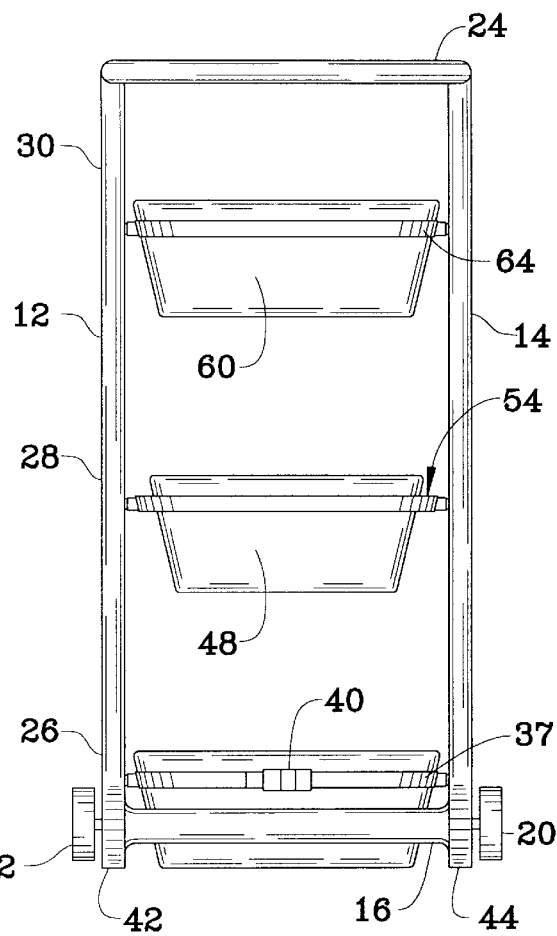
FIG. 2 is a rear elevational view of the invention illustrated in FIG. 1.
Figure 3:
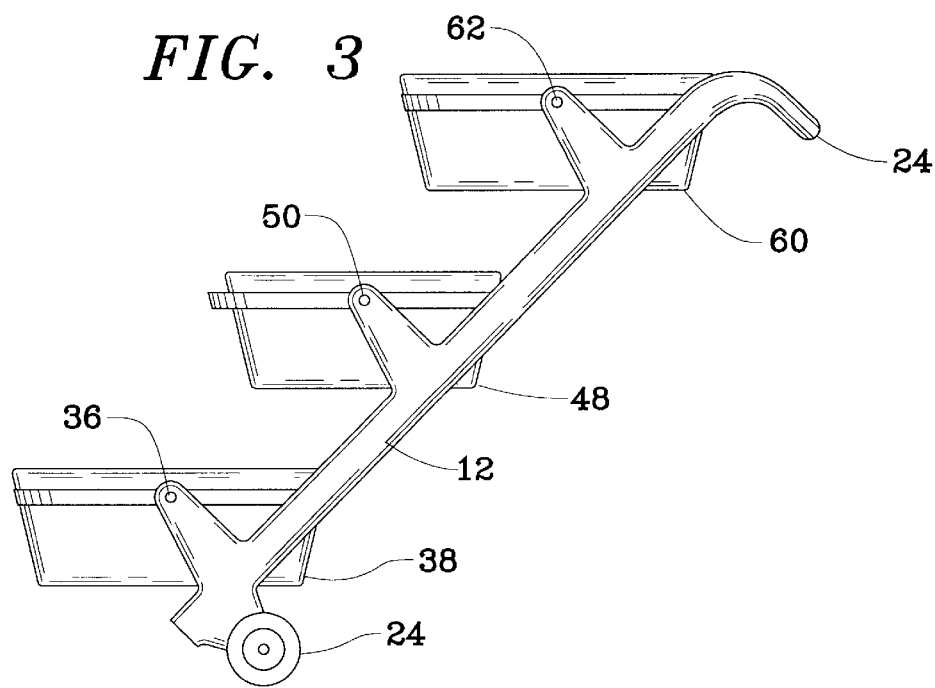
FIG. 3 is a side view of FIG. 1 with the frame placed in an angular position.

Now referring in general to FIGS. 1 through 3, shown is a first embodiment of the instant invention comprising an upright rail 12 coupled to a second upright rail 14 by use of a connector 16 which houses an axle 18 for wheels 20, 22 and an upper connector 24 providing structural rigidity to the frame and further acts as a handle.

A frame is used to hold the bins using either rails constructed of metal or plastic alternatively, the frame can be molded from a single piece of plastic with rails integrated in a frame structure.

Rail 12 which is a mirror image of rail 14 illustrating a lower cantilever support member 26 which extends outwardly from front edge 28 of the rail having a gradually sloped bottom surface 30 leading to an end point 32 having a substantially horizontal plane leading back to the front edge 28. The slope surface 30 operates to distribute the weight across a portion of the front edge 28. Pivot point 36 is made available for placement of a support bracket 37 used in support of bin 38. The pivot point provides pivoting of the bin when placed in a tilted position as shown in FIG. 3. The pivot point 36 fictionally engages the bracket 37 to prevent oscillating of the bin 38 when moved such that the bin will not over rotate so as to spill the contents.

The lower bin 38 is coupled to the bracket 37 by use of a rigid sleeve having a flexible strap with an over center latch 40 allowing the bin 38 to be securely coupled to the bracket 37. The sleeve allows various sized bins to be attached to the device with the strap length shortened accordingly. The lower bin operates as a base in conjunction with the bottom end 42 and 44 of the upright rails for maintaining the device in a upright position. In this manner the wheels 20 and 22 are lifted from the ground providing a stable base. Preferably the lower bin is filled with heavier materials such as paper which provides sufficient balance for subsequent filling of the upper bins. The lower surface of the bin 38 is set directly on the ground surface to prevent movement of the caddy while the device is in a stacked position. Handle 24 provides an area for the worker to grasp when moving the device and as a stand in combination with the wheels allowing the rails to be placed in a horizontal position providing access to each of the bins in a side-by-side position. Further, the device allows the user flexibility in placing the bins in a stacked position or a horizontal position to accommodate the particular needs in filling. For example, if the homeowner has sufficient space in his garage, then the device may be placed in a horizontal position with recyclable items simply tossed into the appropriate bin. If a homeowner has limited space, and perhaps places the recycling bins in a closet, it is appropriate that the bin holder is placed in an upright position allowing insertion of such recyclable materials. Similarly, should a company use the device for mail or movement of materials to an assembly line, the worker may place the bins in a horizontal or stacked position based upon the particular situation.

A second cantilever support structure 46 is located a predetermined distance above the first cantilever support structure 26 providing bin support by use of pivot point 50. Bin 48 may be of a similar size as bin 38 or smaller in size wherein the sleeve 52 may be solid with an insert 54 placed within the sleeve 52. In this embodiment, bin 48 is of a pre-designed shape having a lip portion 56 which encompasses the perimeter of the upper portion of the bin 48. The insert 54 engages the lip 56 to prevent the lip from falling through the sleeve 52.

A third cantilever support structure 58 is located a predetermined distance above the second cantilever support structure 46 providing bin 60 support by use of pivot point 62. Support bracket 64 in this embodiment is shown as solid sleeve without need of an insert relying upon lip portion 66 which encompasses the perimeter of an upper portion of the bin 60.

The pivots allow the frame to be moved from an upright position as shown in FIG. 1 to a tilt position as shown in FIG. 3, and further still to a horizontal position, not shown, wherein the bins are maintained in a horizontal plane. The handle 24 and wheels operate to maintain the rails parallel to the ground when the device is placed in a horizontal position.

The size of the bins depend upon the service that the device is to be used for. For instance, the mail room of a large company may use the device in one application for holding of first class mail in a top bin, third class mail in the second bin, and packages in the third bin. The mail room worker can then simply wheel the cart to the post office where the bins are removed and emptied accordingly. This prevents the worker from attempting to carry heavy bins which can result in injury. Alternatively, the bins may be the conventional recycle type bins of different colors such as blue for glass, green for metal, and yellow for paper.

Figure 4:
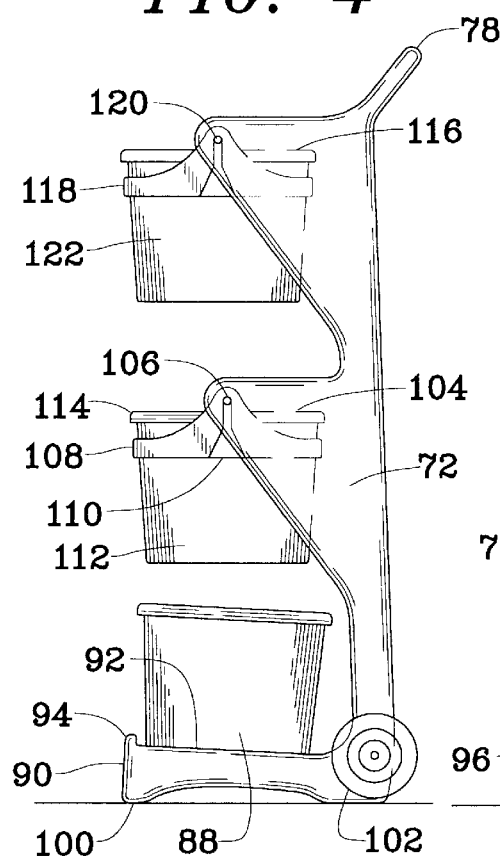
FIG. 4 is a side elevational view of a second embodiment having two bins pivotally supported to a frame with a platform structure.
Figure 5:
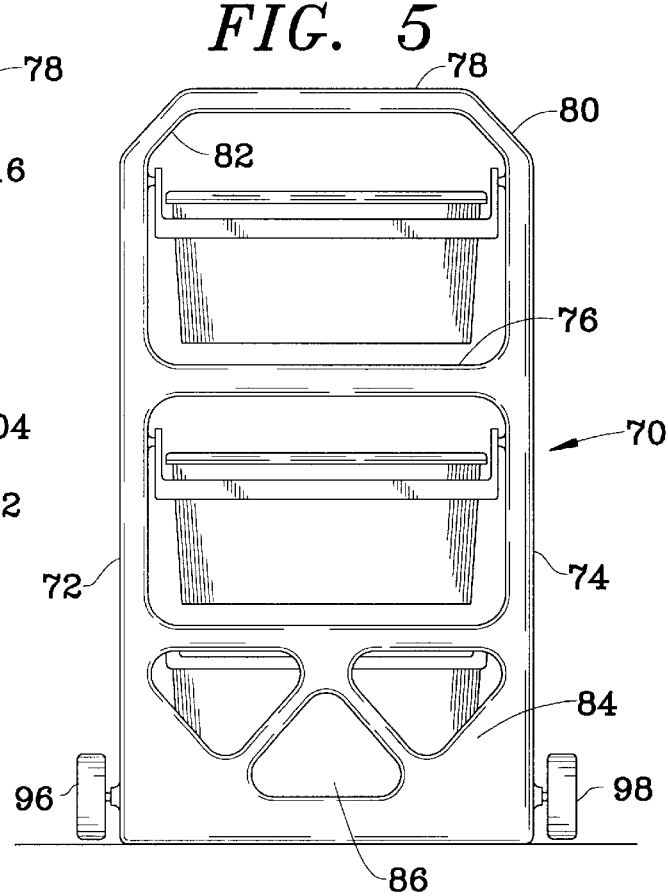
FIG. 5 is a rear elevational view of FIG. 4.
Figure 6:
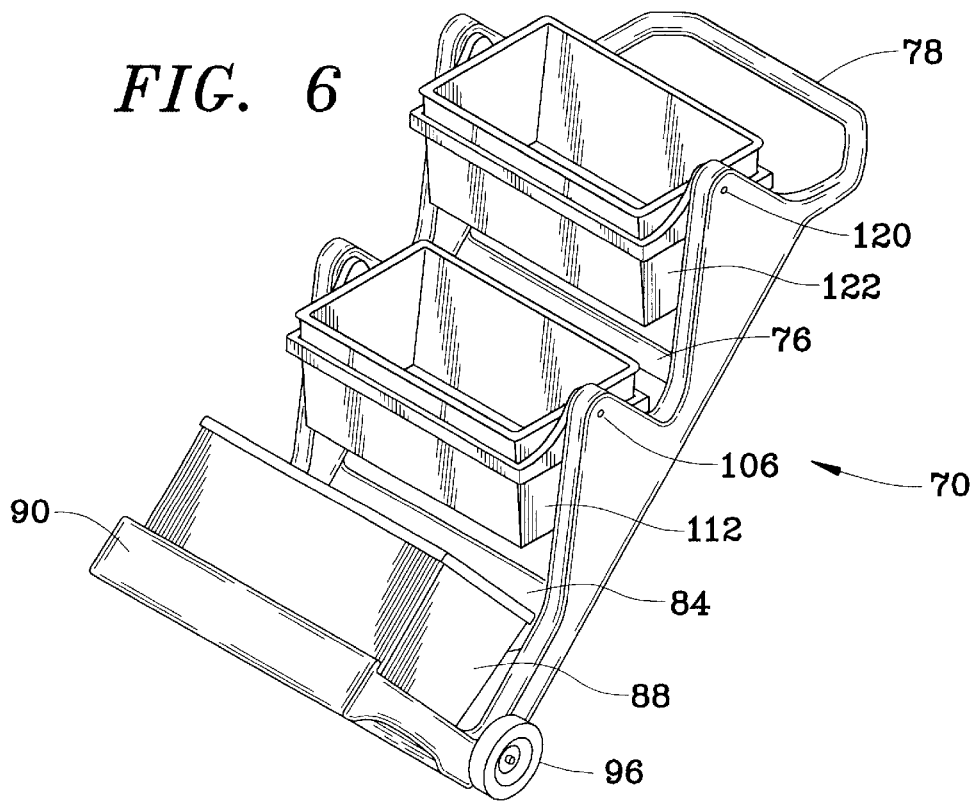
FIG. 6 is a perspective view of FIG. 4.

Now referring to FIGS. 4–6, a second embodiment of the invention is illustrated by integration of the rails into a rigid frame 70 molded from a single piece of plastic having a first upright rail 72 coupled to a second upright rail 74 by use of a cross-connect 76 disposed along the middle portion of the upright supports having an upper support 78 which further operates as a handle having angular supports 80 and 82 for providing an ornamental design. A lower portion of the device provides a back 84 as shown with a plurality of cutouts 86 to lessen the amount of material used in forming the back with an objective of providing sufficient rigidity to prevent the sliding of a lower bin 88 through the backing 84 when the device is in a tilted position as shown in FIG. 6. Lower platform structure 90 is provided having a flat upper surface 92 with a raised lip 94 to prevent the bin from sliding off the front surface of the support while the backing 84 prevents the bin from sliding off the back portion of the surface 92. In this embodiment the support platform 90 operates to support the bin 88 as well as the support structure by use of a dolly shape having wheels 96 and 98 raised from the ground while the device is in a stacked position. Base support 90 includes front portion 100 and a rear portion 102 which lift the wheels to prevent movement of the device when placed in its upright position.

As shown by way of illustration, the second embodiment includes a first integrated cantilever support 104 having a pivot point 106 for support bracket 108. The bracket includes a predefined cavity 110 for the slidable insertion of the pivot 106. The alignment entrance area 110 is enlarged along the lower edge of the support bracket and is narrowed to the diameter of the pivot point to prevent accidental dislodgment of the bracket. In this embodiment the bin 112 is inserted into the sleeve of the bracket 108 wherein the lip 114 of the bin 112 prevents the bin from sliding through the sleeve. Similarly, upper cantilever support 116 utilizes support bracket 118 by pivot point 120. The bracket 118 allows for the slidable insertion of bin 122. As in the aforementioned embodiment, the bins may be of different sizes and can be used for holding numerous materials not limited to recycling materials, mail products, and piece parts for assembly on the manufacturing floor.

As shown in FIG. 6, the device is tilted by pulling back on handle 78 for engagement of the wheels allowing movement of the bins. As shown by way of illustration, bin 112 and 122 are maintained in a horizontal position by gravity as the pivot points 106 and 120 are placed at a position above the bin providing stability. The lower bin 88 is shown placed upon support surface 90 where it engages the back portion 84 to prevent the bin from sliding through the frame during transportation.

Now referring to FIG. 7, set forth is another embodiment of the instant invention having a frame 130 similar to the second embodiment with a rigid support platform 132 raising wheels 134 of f the ground when the device is in an upright position. Handle 136 allows the operator to tilt the device as well as place the device in a horizontal position. In this embodiment, the device includes an adjustable shelf 138 providing a flat platform 140 having two removable side walls and a back wall which can be raised or lowered in relation to the platform structure 132 by use of adjustment holes 142 positioned along the length of the frame. Cantilever support 144 holds a sling 146 for placement of a bin 148 in a similar manner as the aforementioned embodiments. The use of a sling 146 allows the bin 148 to be slid off the sling or lifted therefrom with minimal effort. To prevent swinging of the sling, arm bracket 150 is provided to engage the bottom surface of the sling 146 to lock the sling in the preferred position. By way of illustration, the sling as illustrated would be locked in a horizontal and parallel position to the bottom support platform 132. A hook 152 may be used to hold a support bag 154 for placement of the items therein.

Now referring to FIG. 8, shown is the frame 30 set forth in FIG. 7 having the platform structure 132 and pair of wheels 134 and 134' having an axle mounting said wheels on a lower portion of the upright structure in transversely spaced relation for rotation about a transversely extending axis of rotation. The device is shown with adjustments slots 142 with an adjustable bracket 160 having a pivot point 162 placed on one side and pivot point 164 located on the other side for placement of a bin therebetween. The pivot point 162 is shown on bracket 166 having ridge 168 for engagement of an adjoining ridge 170 on bracket 172. A slot is provided on the length of each bracket 166 and 172 for placement of coupling bolts 174 which allow for the securement of the bracket 160 to the frame 130. The slots allow for the pivot points 162 and 164 to be moved outwardly or inwardly according to the perimeter shape of the bin to be held. In addition the adjustment holes 142 allow for the bracket 160 to be raised or lowered accordingly allowing the addition of multiple bins on the device. Handle 136 is available for tilting of the device onto the wheels 134 for transporting the device.

Now referring in general to FIGS. 9 through 14, a fourth embodiment of the instant invention is depicted which consists of a caddy constructed from a frame having steel tubing with a rotatable upper bracket sized for accommodating a recycling bin, and a lower bracket sized for supporting a fixed recycling bin. In particular, with reference made to FIG. 9, set forth is a pictorial view of the caddy 200 having frame 202 constructed of a single piece of steel tubing. The frame 202 is formed into an inverted U-shape with ends 204 and 206 secured to a base plate 208 creating a rigid structure by weldment.

A handle portion 210 is defined along angular bend 212 providing an ergonomic shape for use in tilting of the frame onto wheels 214 and 218 which are coupled to the frame 212 by support members 220 and 222. Each support member includes a bearing aperture 224 allowing axle 226 to extend between the supports 220 and 222 placing the wheels in a transversely-spaced relation for rotation about the axle 226 in a transversely-extending axis of rotation.

A base extender 228 provides an extension to the base plate 208 by use of a frame comprising end member 230 secured to side members 232 and 234, which are hingedly secured to the ends 204 and 206 of the frame 202. The base extender 228 can be rotated into an upright position, wherein the base plate 208 operates as a support in a similar format as found with a conventional dolly. When the base extender is placed in a operable position, such as that illustrated in the FIGS., end member 230 operates in conjunction with base plate 208 to support the weight of the recycling bin placed thereon. A cross support 236 reinforces side members 232 and 234 by preventing the side members from expanding should a recycling bin of excessive weight be placed thereon. Axle 226 prevents the recycling bin from sliding through the frame opening when the caddy is tilted onto the wheels.

A bracket assembly 240 is supported along an upper portion of the frame 202, wherein the bracket assembly 240 includes a first side support 242 removably coupled to one side of the frame 244, and a second side support 246 coupled to a second side 248 of the frame. The first side support 242 is further defined by an upper, outwardly extending support member 250, having a proximal end 252, coupled to said side 244 of the frame 202. A lower support member 254 has a proximal end 256 coupled to said side 244 of the frame. The distal end of the upper outwardly extending support member 250 and lower outwardly extending support member 254 are joined in a triangular shape by coupling together along coupling point 258 to maintain each of the distal ends in a fixed position.

Sleeve 260 is sized to secure about the outer surface of a bin 400 for releasably securing the bin therein. The sleeve 260 is rotatably coupled to a pinion which extends inwardly from coupling point 258 which is also used to couple support members 250 and 254 together. The sleeve 260 having a pinion aperture 261 which is operatively associated with said pinion for maintaining a bin in a horizontal position to the ground when the frame 202 is placed in a tilted position.

For clarity, only one side of the upper and lower support members which form the bracket means 240 are enumerated, with an opposing side forming a mirror image.

Figure 10:
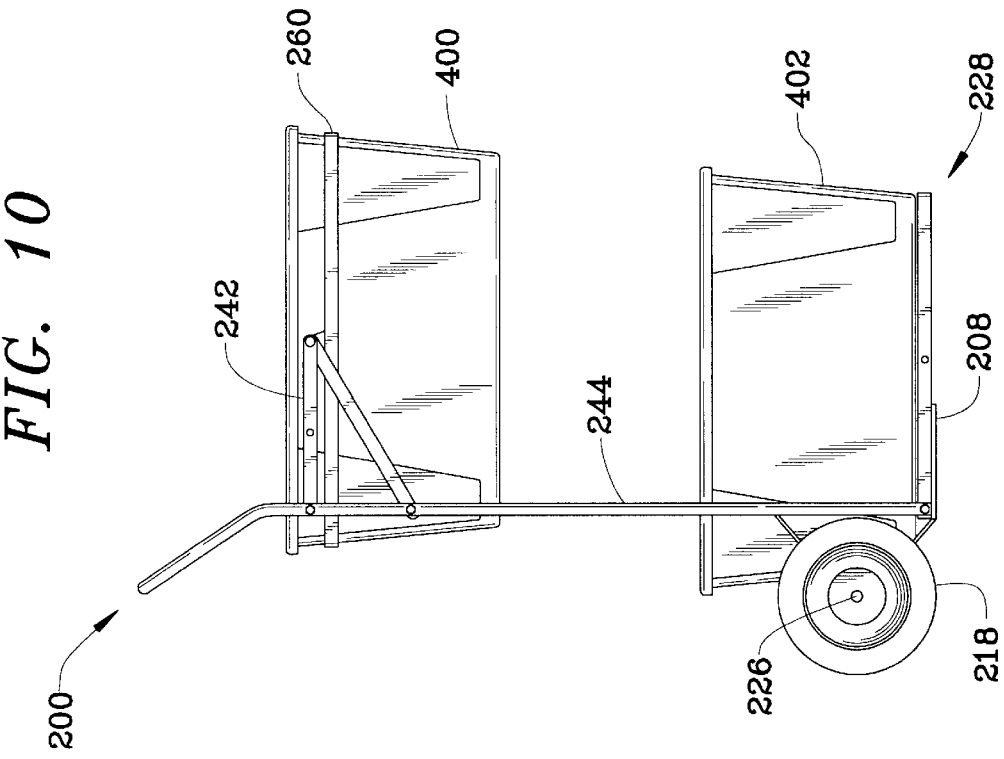
FIG. 10 is a side elevational view of FIG. 9 with bins included for purposes of illustration.
Figure 9:
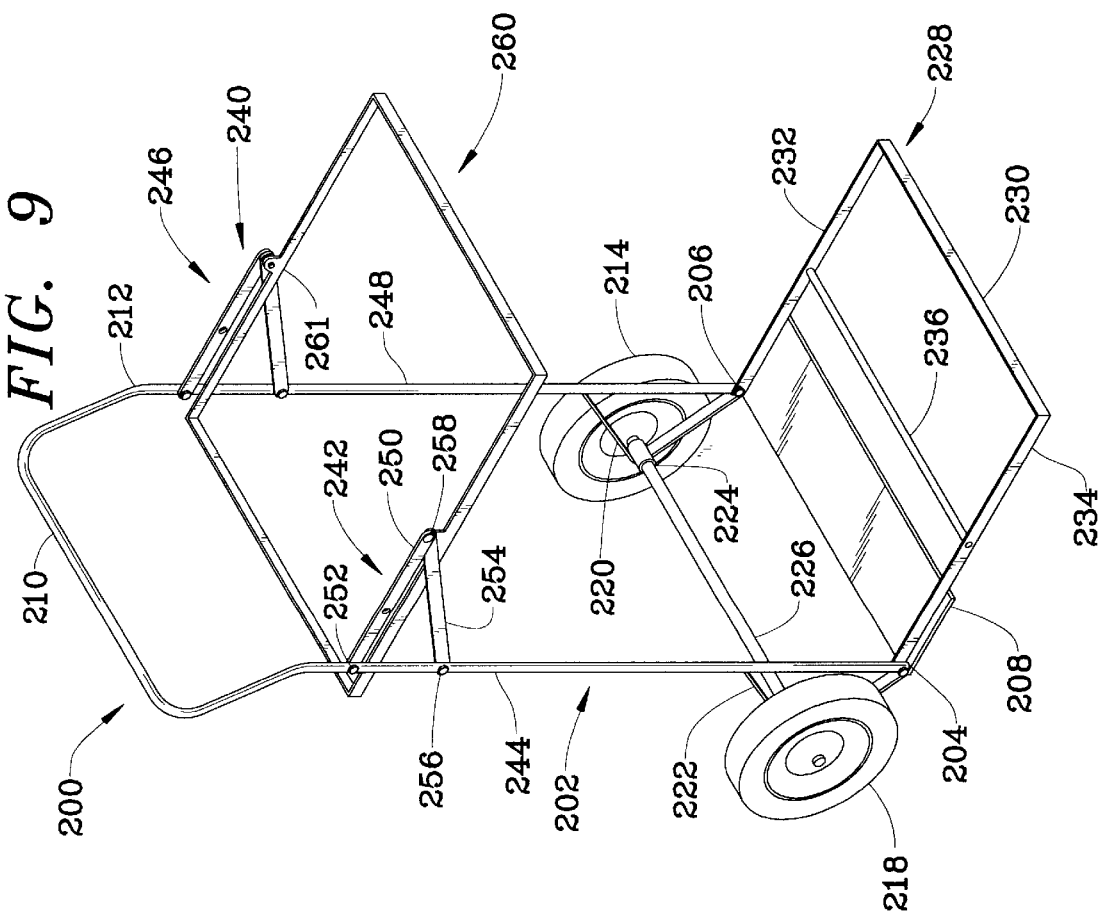
FIG. 9 is a perspective view of a fourth embodiment of the invention.

Now referring to FIG. 10, set forth is a side view of the instant invention 200, having bin 400 placed within sleeve 260, as supported by bracket assembly 240. Similarly, bin 402 is shown placed on base extender 228, with a portion of the bin fitting between frame side 244 for positioning against axle 226 depicted in the center of wheel 218. The base plate 208 provides the frame 200 with an upright stance, so as to allow the bins 400 and 402 to be loaded with materials as necessary.

Figure 11:
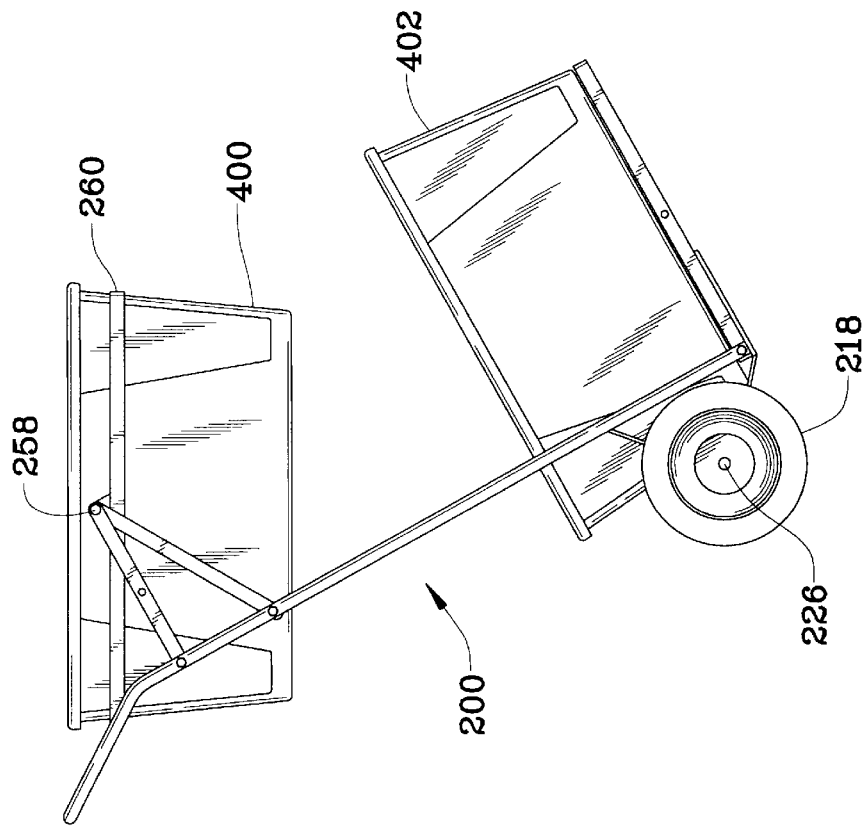
FIG. 11 is a side view of FIG. 10 illustrating a tilted position.

Referring to FIG. 11, the frame 200 is illustrated in a tilted positioned by rotating the device onto the wheels 218, wherein bin 400 is maintained in a horizontal position to the ground with the sleeve 260 rotating about the aforementioned pinion located at the coupling joint 258. Thus, the upper bin holds items that may otherwise spill if such items were placed in a tilted position. For instance, aluminum cans are light enough that they spill out of a bin if placed in a tilted position. However, paper or the like items placed in bin 402 are required to be maintained in a horizontal position, as long as the recycling goods are not placed above the level of the bin. In the tilted position, bin 402 is prevented from sliding through the frame by axle 226.

Figure 12:
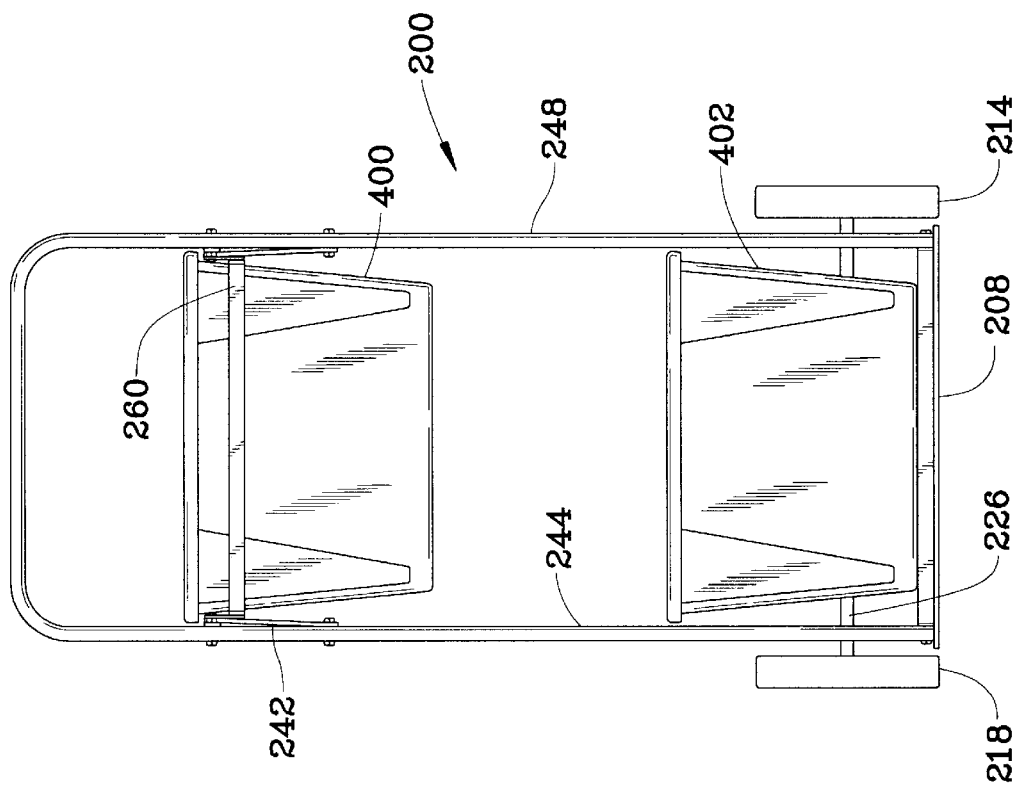
FIG. 12 is a front elevational view of FIG. 10.

FIG. 12 depicts a front view of the invention 200, with bin 400 placed within sleeve 260. The illustration depicts clearance on the inner side surface of each frame side 244 and 248, so as to allow free rotation of a conventional recycling bin without interfering with bracket supports 242,246. Similarly, lower bin 402 is placed within frame sides 244 and 248, with sufficient clearance to allow for the slidable insertion of a bin yet allow for ease of removal. The base plate 208 and wheels 218 and 214 provide stability for an upright stance allowing the consumer to easily insert items into the bins as the apparatus 200 operates as a storage device by placing the bins in a stacked position permitting access to each of the bins.

FIG. 13 is a pictorial view of the instant invention 200, depicting upper bin 400 and lower bin 402 in hidden lines. The upper bin 400 may include the use of an insert, not shown, within the sleeve 260 for use with smaller sized bins such as those used in a mailroom. Similarly, the lower bin 402 may be of any size that fits within the sides of the frame 244 and 248, as the rear axle 226 prevents the bin from moving past the point of position as limited by the axle. Center support 236 provides support for the inner side of a bin, despite the width or length of the bin. In this manner, should a bin have a length that does not extend to end member 230, middle member 236 provides the support in combination with base plate 208.

Now referring to FIG. 14 caddy 200 is shown with a single receptacle 404 placed upon the base extender 228. The upper brackets 242 are disengaged with the distal end of the lower support member 256 allowed to extend along the side 244 of the frame. An aperture 263 allows for securement of the bracket along the length of the side frame by placement of the bolt previously used on the proximal end 256 of the lower support member through the aperture 263 and an aperture hole 262 that is formed in side frame 244 and 248 of the frame 200. In this manner, the upper support is secured to the frame in two locations for maintaining a rigid position. In addition, the lower support member, which remains secured to the upper support member, need only be fastened to maintain the entire length of the assembly in a position that will not interfere with the placement of large articles such as the trash can receptacle 404, shown in the pictorial illustration. In addition, it should be noted that the base extender 228 can be placed in a raised position, allowing the caddy 200 to operate in a manner similar to a dolly. The base extender is secured between the sides 244 and 248 of the frame with brackets 264 and 268, preventing the overextension of the base extender 228 past an upright position when the caddy is used only with the base plate 208. Members 264 and 268, having a width extending beyond the diameter of the tubing, engage the side members 234 and 232 of the base extender 228.

It is to be understood that while I have illustrated and described certain forms of my invention, it is not to be limited to the specific forms or arrangement of parts herein described and shown. It will be readily apparent to those skilled in the art that various changes may be made without departing from the scope of the invention and the invention is not to be considered limited to what is shown in the drawings and described in the specification.

What is claimed is:

1. A caddy for use in combination with a first bin and a second bin, said first bin being a rectangular recycling bin including a bottom wall with four vertical sidewalls extending upward therefrom to an outwardly extending lip disposed along an upper portion of each said sidewall, said caddy comprising:

a frame constructed from a single piece of steel tube, said frame having an inverted U-shape with each end of said tube secured to a base plate, said base plate extending orthogonally from said frame;

a base extender means hingedly secured to said frame;

a pair of wheels rotatably secured to a lower portion of said U-shaped tube adjacent to said base plate and being in transversely spaced relation for rotation about a transversely extending axis of rotation; and a bracket assembly adjustable attached to said frame, said bracket assembly including a first side support spaced apart from a second side support, each side support extending from said frame; and a securement sleeve pivotally mounted between said side supports, said securement sleeve operatively associated with said bin lip and sized to removably support said first bin;

whereby when said second bin is placed upon said base plate, said second bin is maintained in a fixed orientation with respect to said frame during transporting, and while said first bin is supported within said bracket assembly, said first bin is maintained in a substantially horizontal orientation irrespective of said frame orientation, and wherein upon tilting of said frame, said wheels are placed in rolling contact with a surface for transporting of said bins along said surface while allowing said first bin to remain horizontally oriented during transporting.

2. The caddy according to claim 1 wherein the U-shaped section of said frame forms a handle for use in tilting said frame onto said wheels.

3. The caddy according to claim 1 including an insert means to selectively reduce the size of said securement sleeve whereby a third bin may be substituted for said first bin, said third bin being smaller than said first bin.

* * * * *